(12) United States Patent
Pampinella

(10) Patent No.: US 6,234,007 B1
(45) Date of Patent: May 22, 2001

(54) LEAK TESTING DEVICE

(75) Inventor: Joseph A. Pampinella, Woodbridge, VA (US)

(73) Assignee: Inflow Products, Inc., Vienna, VA (US)

( * ) Notice: Subject to any disclaimer, the term of this patent is extended or adjusted under 35 U.S.C. 154(b) by 0 days.

(21) Appl. No.: 09/340,438

(22) Filed: Jun. 28, 1999

(51) Int. Cl.[7] ................. G01M 3/04; F16K 3/02
(52) U.S. Cl. ................. 73/49.8; 138/89; 138/90; 138/94; 251/319
(58) Field of Search ................. 73/40.5 R, 46, 73/49.1, 49.5, 49.8; 138/89, 90, 94; 251/319, 324

(56) References Cited

U.S. PATENT DOCUMENTS

| | | |
|---|---|---|
| 1,133,714 | 3/1915 | Elder . |
| 1,928,316 | 9/1933 | Muto . |
| 2,823,887 | 2/1958 | Osinki . |
| 3,232,577 | 2/1966 | Sargent . |
| 3,941,349 | 3/1976 | Pierson ................. 251/326 |
| 3,945,604 | 3/1976 | Clarkson . |
| 4,176,756 | 12/1979 | Gellman . |
| 4,194,721 | 3/1980 | Nachtigahl ................. 251/326 |
| 4,429,568 * | 2/1984 | Ullivan ................. 73/49.8 |
| 4,763,510 | 8/1988 | Palmer . |
| 4,795,197 | 1/1989 | Kaminski et al. . |
| 4,895,181 * | 1/1990 | McKavanagh ................. 138/94.3 |
| 5,018,768 | 5/1991 | Palatchy . |
| 5,076,095 | 12/1991 | Erhardt ................. 73/49.8 |
| 5,197,324 | 3/1993 | Keys . |
| 5,269,568 | 12/1993 | Courturier . |
| 5,287,730 * | 2/1994 | Condon ................. 73/49.8 |
| 5,385,373 | 1/1995 | Love . |
| 5,782,499 | 7/1998 | Gfrerer et al. . |

* cited by examiner

*Primary Examiner*—Daniel S. Larkin
(74) *Attorney, Agent, or Firm*—Dinesh Agarwal, P.C.

(57) ABSTRACT

A leak testing device includes a generally cylindrical elongated sealing gasket which defines a recess therethrough. The gasket includes first and second end portions for receiving the respective ends of two adjacent conduits. A shoulder portion extends radially into the recess for supporting a diaphragm member thereon. The diaphragm member includes a diameter substantially corresponding to the diameter of the recess. In a preferred embodiment, the diaphragm member is made intregal with the gasket. A hole is provided in the diaphragm member which can be selectively opened or closed by a valve assembly provided on the diaphragm member to thereby permit or restrict the flow of a fluid between the two conduits.

18 Claims, 2 Drawing Sheets

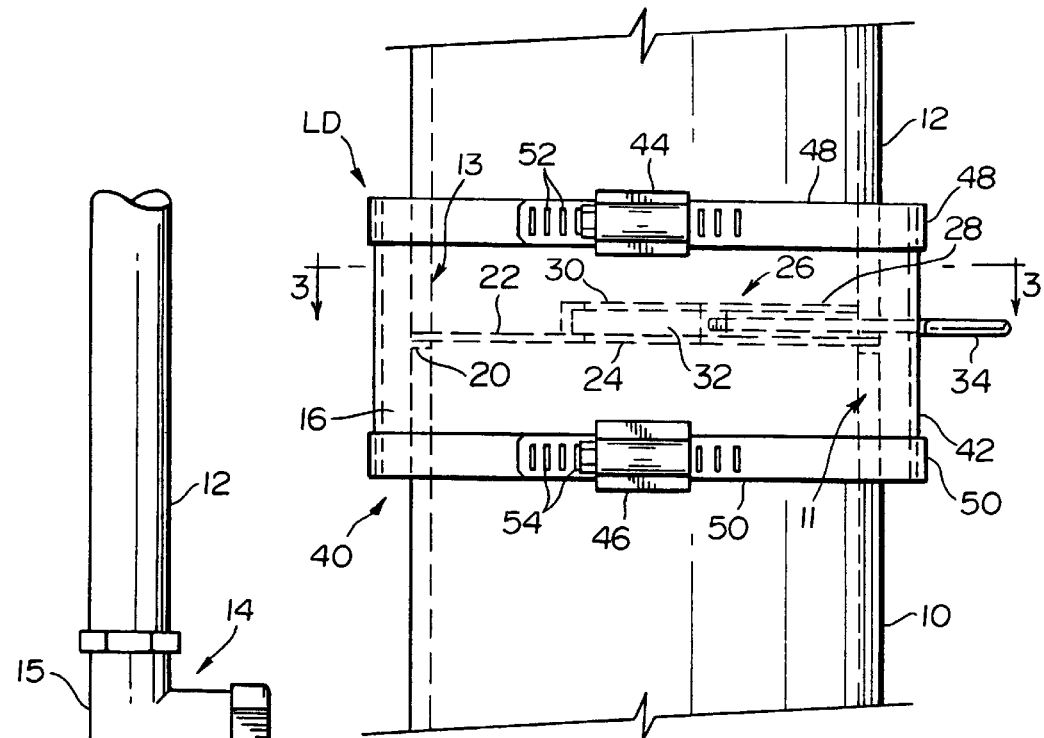
FIG. 2
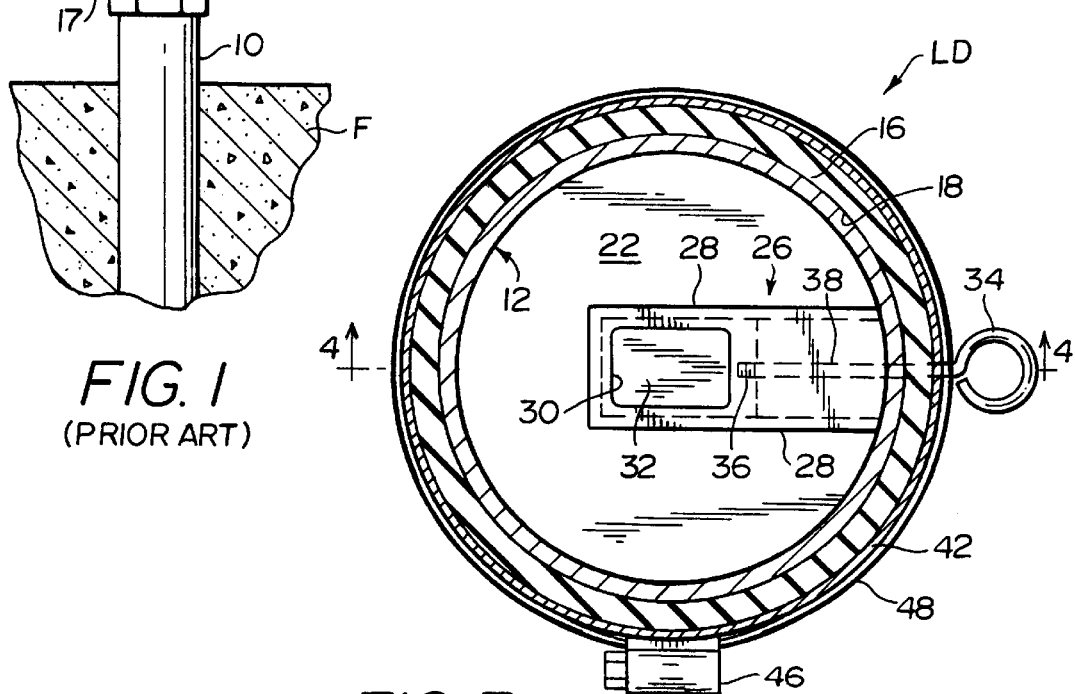
FIG. 1
(PRIOR ART)
FIG. 3

LEAK TESTING DEVICE

FIELD AND HISTORICAL BACKGROUND OF THE INVENTION

The present invention is directed to a leak testing device to be positioned between two adjacent conduits.

In the plumbing industry, it is common to test pipes for leaks prior to use. In particular, in the installation of new plumbing systems in buildings, or the replacement of an existing pipe, the government regulations require that a pipe be leaked-tested prior to its use as part of the overall plumbing system. The current practice is to install a T-fitting between the new pipe and an existing adjacent pipe. The two arms of the T-fitting are vertically connected to the ends of the new and existing pipes with a conventional split-clamp assembly. The side-arm of the T-fitting includes a screw-on cap which can be removed for allowing access to the inside of the T (FIG. 1).

The testing procedure involves a plumbing professional to manually insert a pneumatically inflatable plug through the side-arm of the T-fitting and into the end opening of the new pipe. The plug is then inflated to seal-off the new pipe opening leading into the T-fitting. The new pipe, which in many instance extends to one or more floors of a building, is then filled with a fluid, typically water, and is left in this condition until a government official visually inspects the new pipe for any leaks. Upon completion of the inspection, the fluid from the new pipe must be discharged for final assembly of the plumbing system. The fluid discharge involves deflating the plug by actuating a valve located on the plug which is completely hidden inside the T-fitting. The access to the valve is typically gained through the side-arm of the T-fitting.

The current practice of deflating the plug and removing it from inside the T-fitting is not very desirable in that severe physical injury, including death, or property damage may result if the plug fails for any reason, or due to improper handling thereof. The inflation of the plug to a desired pressure of 30 PSI, and its deflation at the completion of the testing procedure, requires additional equipment and proper training of the associated technician. This procedure further involves the use of a T-fitting which adds to the overall expense of the testing procedure. Finally, in many instances, the inflatable plug weakens or gets damaged due to inflation and deflation and can not be reused.

In view of the above, there is a need in the industry for a leak testing device which is safe for the plumbing professional and the surrounding property, inexpensive to manufacture, easy to use, and simple in construction.

Examples of various valves and pipe testing devices are disclosed in U.S. Pat. Nos. 1,133,714; 2,823,887; 3,232,577; 3,941,349; 3,945,604; 4,194,721; 5,076,095; and 5,197,324.

OBJECTS AND SUMMARY OF THE INVENTION

The principal object of the present invention is to provide a leak testing device which does not suffer from the disadvantages of the conventional devices.

An object of the present invention is to provide a leak testing device which can be easily provided between two adjacent conduits.

Another object of the present invention is to provide a leak testing device which is safe to use in that it does not threaten physical injury to the plumbing professional, property damage, or damage to others.

Yet another object of the present invention is to provide a leak testing device which eliminates the use of a T-fitting.

An additional object of the present invention is to provide a leak testing device which does not require additional equipment, such as a pneumatic pump or the like for inflation and deflation purposes.

Yet an additional object of the present invention is to provide a leak testing device which is simple in construction, inexpensive to manufacture and is reusable.

In summary, the main object of the present invention is to provide a leak testing device which can be easily installed between two adjacent conduits. The device is simple in construction, easy to use and reuse, and does not pose danger of bodily harm to the plumbing professional and associated personnel or risk of property damage, and is inexpensive to manufacture.

In accordance with the invention, the leak testing device includes a generally cylindrical elongated sealing gasket which defines a recess therethrough. The gasket includes first and second end portions for receiving the respective ends of two adjacent conduits. A shoulder portion extends radially into the recess for supporting a diaphragm member thereon. The diaphragm member includes a diameter substantially corresponding to the diameter of the recess. In a preferred embodiment, the diaphragm member is made intregal with the gasket. A hole is provided in the diaphragm member which can be selectively opened or closed by a valve assembly provided on the diaphragm member to thereby permit or restrict the flow of a fluid between the two conduits.

BRIEF DESCRIPTION OF THE DRAWINGS

The above and other objects, advantages and novel features of the present invention will become apparent from the following detailed description of the preferred embodiment of the invention, illustrated in the accompanying drawings, wherein:

FIG. 1 is a partial elevational view of a plumbing system showing a T-fitting installed between two conduits;

FIG. 2 is a partial elevational view showing the leak testing device of the invention installed in cooperation with two adjacent conduits;

FIG. 3 is a cross-sectional view taken along line 3—3 of FIG. 2;

DETAILED DESCRIPTION OF THE INVENTION

As illustrated in FIG. 1, the leak testing device LD of the present invention is used in connection with an existing pipe or conduit 10 extending from a floor F or the like, and a new pipe 12. Conventionally, a T-fitting 14 is provided between the existing and new pipes 10 and 12, respectively, prior to testing the new pipe 12 for any leaks. In this regard, it is noted herewith that the leak testing device LD of the present invention can be used with a T-fitting, and preferably without a T-fitting, as shown in FIG. 2.

Figure 4:
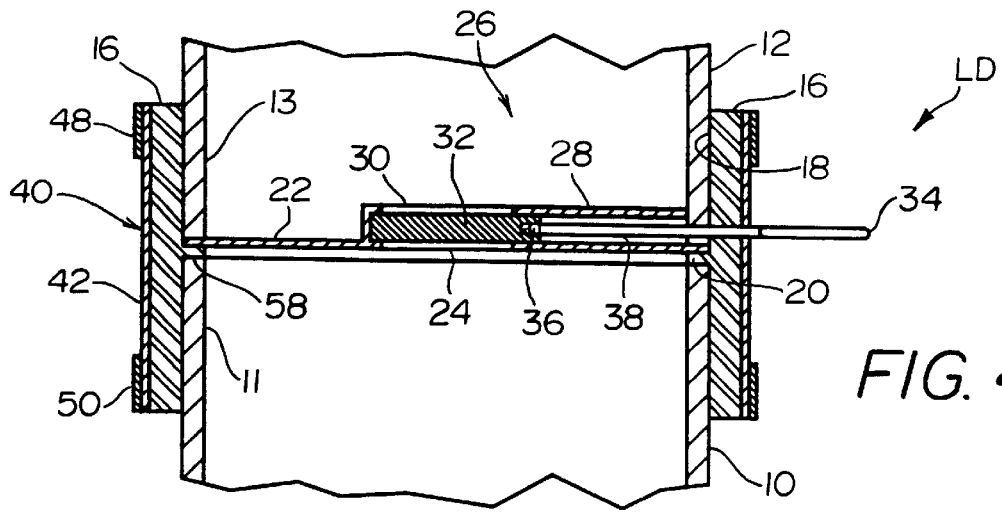
FIGS. 4 is a vertical cross-sectional view taking along line 4—4 of FIG. 3.
Figure 5:
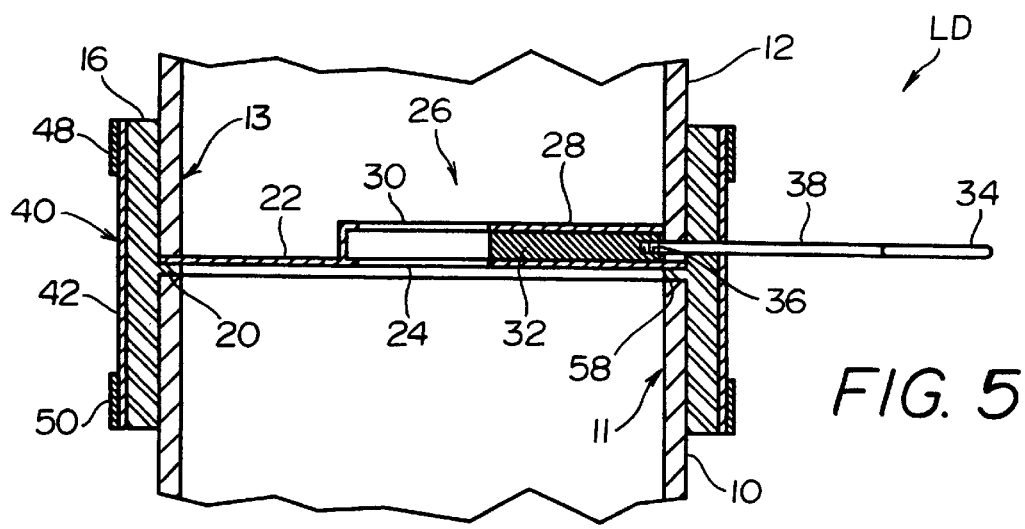
FIG. 5 is a view similar to FIG. 4, showing the valve in the open position.

As best shown in FIG. 3, the leak testing device LD includes a generally cylindrical elongated gasket 16 which defines therein a recess 18. As best illustrated in FIGS. 4–5, a shoulder or lip portion 20 extends radially into the recess 18, and preferably extends throughout the internal perimeter of the gasket 16. In other words, shoulder portion 20 is in the form of an internal ring that extends radially into the recess 18. A substantially circular diaphragm member 22, with a central hole 24, is provided so as to rest on the diaphragm member 22. Preferably, the gasket 16 is made of a resilient or compressible material, and the diaphragm member 22 is made of a generally rigid, yet somewhat flexible material. The diameter of the diaphragm member 22 substantially corresponds to the recess 18 in order to provide a fluid-type engagement therebetween.

As best shown in FIGS. 2–5, the diaphragm member 22 includes a valve assembly 26. Preferably, the valve assembly 26 includes a valve chamber 28 integral with the diaphragm member 22. The valve chamber 28 includes an upper opening 30 which is in vertical alignment with the hole 24 in the diaphragm member 22. A manually actuable valve member 32 slides within the chamber 28 between a closed position (FIGS. 2–4) and an open position (FIG. 5). The dimensions of the valve member 32 are selected so as to substantially correspond to the dimensions of the valve chamber 28, so that when the valve member 32 is in the closed position (FIGS. 2–4), the flow of fluid between the conduits 12 and 10 is restricted. Likewise, when the valve member 32 is in the open position (FIG. 5), the fluid flows between the conduits 12 and 10, through the upper opening 30, valve chamber 28 and the hole 24. In order to facilitate the opening and closing of the valve 32, a manually actuable valve handle 34 is detachably connected to the valve member 32. Preferably, interlocking screw-threads 36 are provided on the valve stem 38 and the valve member 32. As can be observed from FIGS. 2–5, the valve stem 38 extends through the gasket 16 for being detachably connected to the valve member 32.

The leak testing device LD further includes a split-clamp assembly 40 (FIGS. 1–2). In particular, the clamp assembly 40 includes a metal ring 42 split about the location of conventional upper and lower mechanical fasteners 44 and 46. The fasteners 44 and 46 are parts of upper and lower metallic rings 48 and 50, respectively, the diameter of which about the perimeter of the metal ring 42, can be adjusted by actuating fasteners 44 and 46 and interlocking with corresponding series of holes 52 and 54, in a known manner.

Figure 6:
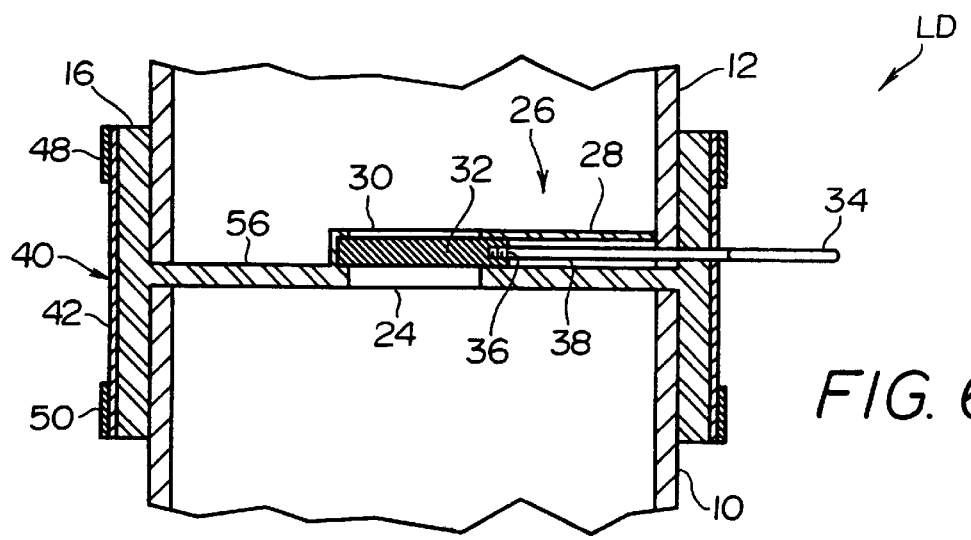
FIG. 6 is a view similar to FIG. 4, showing an alternative embodiment of the leak testing device.

FIG. 6 illustrates an alternative embodiment of the leak testing device LD of the invention, which is similar to the embodiment shown in FIGS. 2–5, with the exception that the diaphragm member 56 is integral with the gasket 16. (It is noted herewith that in the alternative embodiment like parts are designated with the same reference numerals as in the embodiment shown in FIGS. 2–5.) Preferably, the diaphragm member 56 is made slightly thicker than the diaphragm member 22, in order to impart sufficient strength to withstand fluid pressure when the new pipe 12 is filled with a fluid.

Use and Operation

When it is desired to test the leak integrity of a new pipe 12, the leak testing device LD of the present invention is provided such that the respective end portions 11 and 13 of the existing and new pipes 10 and 12 respectively, are slidably received in the recess 18 of gasket 16. As best shown in FIGS. 4–5, the end portion 11 of the pipe 10 would sealingly engage the lower surface 58 of the shoulder portion 20. The end portion 13 of the pipe 12 would come to sealingly engage the diaphragm member 22. The clamp assembly 40 would then be provided and tightened around the gasket 16, to form a fluid-tight engagement between the leak testing device LD and the end portions 11 and 13 of the pipes 10 and 12. The valve handle 34 would then be actuated to close the hole 24 in the diaphragm member 22 (or 56). Upon assuring that the leak testing device LD is in proper fluid-tight engagement with the pipe end portions 11 and 13, the pipe 12 would then be filled with the fluid and allowed to stand until the inspection for any leaks is completed. Upon completion of the inspection, the valve handle 34 would be carefully and slowly pulled outwardly to allow gradual flow of fluid from the new pipe 12 into the existing pipe 10.

As can be seen from the above, since the opening and closing of the valve assembly 26, is done completely external of the pipes 10 and 12, and the fluid flows only between the pipes 10 and 12, the leak testing device LD of the present invention poses no danger to the personnel or the property involved. In addition, the operation of the leak testing device LD of the present invention does not require any additional equipment, such as a pneumatic pump or the like, and thus the entire procedure is straightforward, fast, and significantly less complicated than the conventional devices. Finally, since the leak testing device LD of the present invention does not require the use of a T-fitting, significant savings in terms of time and expense are achieved.

It is noted herewith that in the instances where the installation of a T-fitting is necessary, the leak testing device LD of the invention can be simply used in the same manner as without a T. In particular, the upper arm 15 of the T-fitting 14 would take the place of the existing pipe 10 with the lower arm 17 thereof connected to the existing pipe 10, and the leak testing device LD can be operated in the same manner as described above.

While this invention has been described as having a preferred design, it is understood that it is capable of further modifications, uses, and/or adaptations of the invention and including such departures from the present disclosure as those come within the known or customary practice in the art to which the invention pertains, and as may be applied to the central features hereinsetforth, and fall within the scope of the invention and of the limits of the appended claims.

What is claimed is:

1. A leak testing device to be positioned between two adjacent conduits, comprising:

a) a generally cylindrical elongated sealing gasket defining a recess therethrough;

b) said gasket including first and second end portions for receiving the respective ends of two adjacent conduits;

c) said gasket including a shoulder portion extending radially into said recess;

d) a diaphragm member having a diameter substantially corresponding to the diameter of said recess for positioning within said gasket and over said shoulder portion;

e) said diaphragm member including a through hole; and f) valve means operably connected to said diaphragm member for selectively opening or closing the hole to thereby permit or restrict the flow of a fluid between the conduits.

2. The leak testing device of claim 1, further comprising:

a) an adjustable split-clamp for providing about the perimeter of said gasket to thereby sealingly clamp the device about the ends of the conduits.

3. The leak testing device of claim 1, wherein:
a) said valve means comprises a valve housing with a sliding member therein.

4. The leak testing device of claim 3, wherein:
a) said valve means comprises an operating handle detachably connected to said sliding member.

5. The leak testing device of claim 4, wherein:
a) said valve housing is mounted on said diaphragm member and extends up to about the peripheral edge thereof.

6. The leak testing device of claim 5, wherein:
a) said handle is positioned exterior of said gasket and includes a stem portion; and
b) said stem portion extends through said gasket for connecting to said sliding member.

7. The leak testing device of claim 4, wherein:
a) said valve housing is integral with said diaphragm member.

8. The leak testing device of claim 1, wherein:
a) said gasket is made of a compressible material; and
b) said diaphragm is made of a substantially rigid material.

9. A leak testing device to be positioned between two adjacent conduits, comprising:
a) a generally cylindrical elongated sealing gasket defining a recess therethrough;
b) said gasket including first and second end portions for receiving the respective ends of two adjacent conduits;
c) said gasket including an integral diaphragm member extending radially into said recess;
d) said diaphragm member completely closing said recess;
e) said diaphragm member including a through hole; and
f) valve means operably connected to said diaphragm member for selectively opening or closing the hole to thereby permit or restrict the flow of a fluid between the conduits.

10. The leak testing device of claim 9, further comprising:
a) an adjustable split-clamp for providing about the perimeter of said gasket to thereby sealingly clamp the device about the ends of the conduits.

11. The leak testing device of claim 9, wherein:
a) said valve means comprises a valve housing with a sliding member therein.

12. The leak testing device of claim 11, wherein:
a) said valve means comprises an operating handle detachably connected to said sliding member.

13. The leak testing device of claim 12, wherein:
a) said valve housing is mounted on said diaphragm member and extends up to about the peripheral edge thereof.

14. The leak testing device of claim 13, wherein:
a) said handle is positioned exterior of said gasket and includes a stem portion; and
b) said stem portion extends through said gasket for connecting to said sliding member.

15. The leak testing device of claim 12, wherein:
a) said valve housing is integral with said diaphragm member.

16. The leak testing device of claim 9, wherein:
a) said diaphragm is made of a substantially rigid material.

17. A method of testing for a leak in a conduit, comprising:
a) providing a first conduit to be leak-tested;
b) providing a second conduit;
c) providing a leak testing device between the ends of the first and second conduits, wherein the leak testing device comprises:
   i) a generally cylindrical elongated sealing gasket defining a recess therethrough;
   ii) said gasket including first and second end portions for receiving the respective ends of the first and second conduits;
   iii) said gasket including a shoulder portion extending radially into said recess;
   iv) a diaphragm member having a diameter substantially corresponding to the diameter of said recess for positioning within said gasket and over said shoulder portion;
   v) said diaphragm member including a through hole; and
   vi) valve means operably connected to said diaphragm member for selectively opening or closing the hole to thereby permit or restrict the flow of a fluid between the first and second conduits;
d) actuating the valve means to restrict the flow of fluid between the first and second conduits;
e) filling the first conduit with a fluid;
f) inspecting the first conduit for any leaks; and
g) actuating the valve means to permit the flow of fluid from the first conduit to the second conduit.

18. A method of testing for a leak in a conduit, comprising:
a) providing a first conduit to be leak-tested;
b) providing a second conduit;
c) providing a leak testing device between the ends of the first and second conduits, wherein the leak testing device comprises:
   i) a generally cylindrical elongated sealing gasket defining a recess therethrough;
   ii) said gasket including first and second end portions for receiving the respective ends of the first and second conduits;
   iii) said gasket including an integral diaphragm member extending radially into said recess;
   iv) said diaphragm member completely closing said recess;
   v) said diaphragm member including a through hole; and
   vi) valve means operably connected to said diaphragm member for selectively opening or closing the hole to thereby permit or restrict the flow of a fluid between the first and second conduits;
d) actuating the valve means to restrict the flow of fluid between the first and second conduits;
e) filling the first conduit with a fluid;
f) inspecting the first conduit for any leaks; and
g) actuating the valve means to permit the flow of fluid from the first conduit to the second conduit.

* * * * *